United States Patent
Harley et al.

(10) Patent No.: US 11,038,549 B1
(45) Date of Patent: Jun. 15, 2021

(54) RECEIVER NOISE LOADING FOR CONTROL LOOP STABILITY

(71) Applicants: James Harley, Richmond (CA); Andrew D. Shiner, Ottawa (CA)

(72) Inventors: James Harley, Richmond (CA); Andrew D. Shiner, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/895,203

(22) Filed: Jun. 8, 2020

(51) Int. Cl.
H04B 1/62 (2006.01)
H04B 17/345 (2015.01)
H04B 1/10 (2006.01)
H04B 1/04 (2006.01)
H04B 17/336 (2015.01)

(52) U.S. Cl.
CPC ............ H04B 1/62 (2013.01); H04B 1/0475 (2013.01); H04B 1/1027 (2013.01); H04B 17/336 (2015.01); H04B 17/345 (2015.01)

(58) Field of Classification Search
CPC .. H04B 10/2507; H04B 1/62; H04B 10/6165; H04B 10/6161; H04B 10/6162
See application file for complete search history.

(56) References Cited

U.S. PATENT DOCUMENTS

| | | | |
|---|---|---|---|
| 6,697,169 B1 * | 2/2004 | Feng | ............... H04N 1/52 358/3.03 |
| 7,561,797 B1 | 7/2009 | Harley et al. | |
| 8,306,438 B2 | 11/2012 | Deczky et al. | |
| 9,225,430 B2 | 12/2015 | Harley et al. | |
| 9,774,394 B2 | 9/2017 | Harley et al. | |
| 2003/0151773 A1* | 8/2003 | Ogawa | ............... H04N 1/40087 358/3.03 |
| 2007/0253515 A1* | 11/2007 | Kawai | ............... H04L 7/0083 375/359 |
| 2013/0177162 A1* | 7/2013 | Lim | ............... G10L 21/0208 381/66 |
| 2013/0308960 A1* | 11/2013 | Horikoshi | ............... H03H 21/0012 398/209 |
| 2017/0310392 A1* | 10/2017 | Boertjes | ............... H04B 10/0793 |
| 2018/0034422 A1* | 2/2018 | Roeschke | ............... H03F 3/245 |

FOREIGN PATENT DOCUMENTS

WO 2009070881 6/2009

OTHER PUBLICATIONS

Hui, et al., "Fiber Optic Measurement Techniques", Elsevier Academic Press, 2009.
Pending U.S. Appl. No. 16/721,747, filed Dec. 19, 2019.

* cited by examiner

*Primary Examiner* — Kevin Kim
(74) *Attorney, Agent, or Firm* — Integral Intellectual Property Inc.; Amy Scouten; Miriam Paton (57) ABSTRACT

A receiver is configured to generate a digital signal representative of data conveyed by a communication signal detected at the receiver, and to apply digital signal processing to the digital signal, thereby generating a processed signal. The receiver is further configured to determine a relative noise estimate for the processed signal, and to load an amount of digital noise into the digital signal processing based on a difference between the relative noise estimate and a target. As a result of the digital noise loading, improved stability of at least one control loop in the receiver may be achieved.

20 Claims, 5 Drawing Sheets

RECEIVER NOISE LOADING FOR CONTROL LOOP STABILITY

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

SUMMARY

According to a broad aspect, a receiver device comprises circuitry configured to perform a method which comprises generating a digital signal representative of data conveyed by a communication signal detected at the receiver, applying digital signal processing to the digital signal, thereby generating a processed signal, determining a relative noise estimate for the processed signal, and loading an amount of digital noise into the digital signal processing based on a difference between the relative noise estimate and a target.

According to some examples, the method further comprises increasing the amount of digital noise responsive to determining that the relative noise estimate is lower than the target.

According to some examples, the method further comprises decreasing the amount of digital noise responsive to determining that the relative noise estimate is greater than the target.

According to some examples, the relative noise estimate comprises an effective noise to signal ratio (ENSR) estimate or a Bit Error Ratio (BER) estimate.

According to some examples, the method further comprises determining a loaded relative noise estimate for a new processed signal that was generated while loading the relative amount of digital noise into the digital signal processing, and calculating a new relative noise estimate based on the loaded relative noise estimate and the relative amount of digital noise.

According to some examples, the method further comprises adjusting the amount of digital noise by causing an adjustment of one or more filters comprised in the circuitry configured to apply the digital signal processing to the digital signal.

According to some examples, the digital signal processing implements at least one control loop, and the method further comprises responsive to loading the amount of digital noise, the at least one control loop operating with more stability than prior to the loading.

According to some examples, the at least one control loop comprises any one or more of a least mean squares (LMS) control loop, an in-phase quadrature (IQ) control loop, and a carrier recovery loop.

According to some examples, the target is a relative noise value greater than a maximum relative noise value associated with instability of the at least one control loop.

According to some examples, the method further comprises selecting the target based on a current transmission mode of the receiver device.

DETAILED DESCRIPTION

Figure 1:
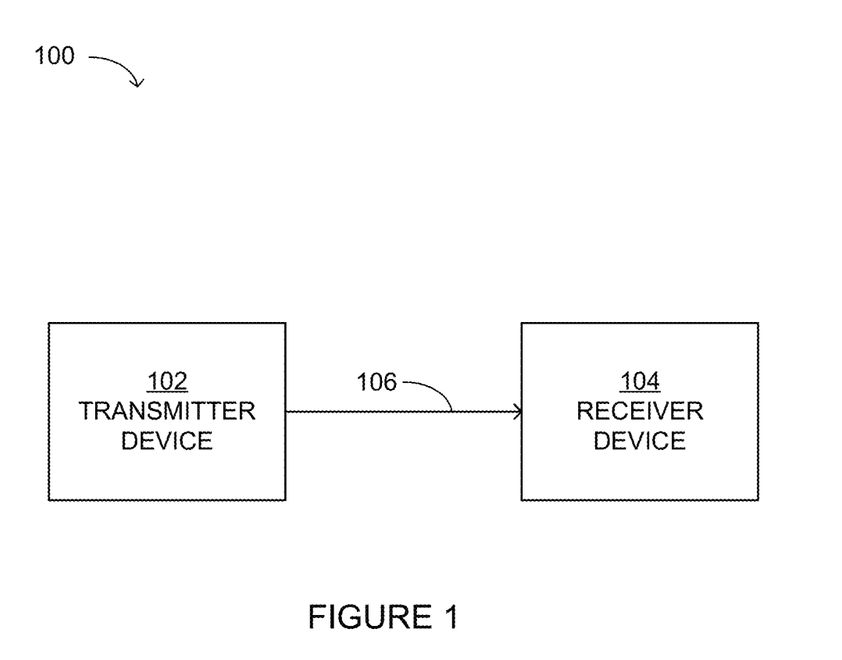
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). SNR values may be converted to logarithmic decibel (dB) units using the relationship $SNR^{dB}=10 \cdot \log_{10} SNR$, or from dB units back to linear units using the relationship $SNR=10^{0.1 \cdot SNR^{dB}}$. SNR and NSR are related in linear units by SNR=1/NSR or in logarithmic dB units by $SNR^{dB}=-1 \cdot NSR^{dB}$. The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over the communication channel 106 from the transmitter device 102, where the communication signal conveys symbols that are representative of digital information. At the receiver device 104, the decoded symbols that are recovered may comprise noisy or distorted versions of the symbols that were originally transmitted by the transmitter device 102.

Figure 2:
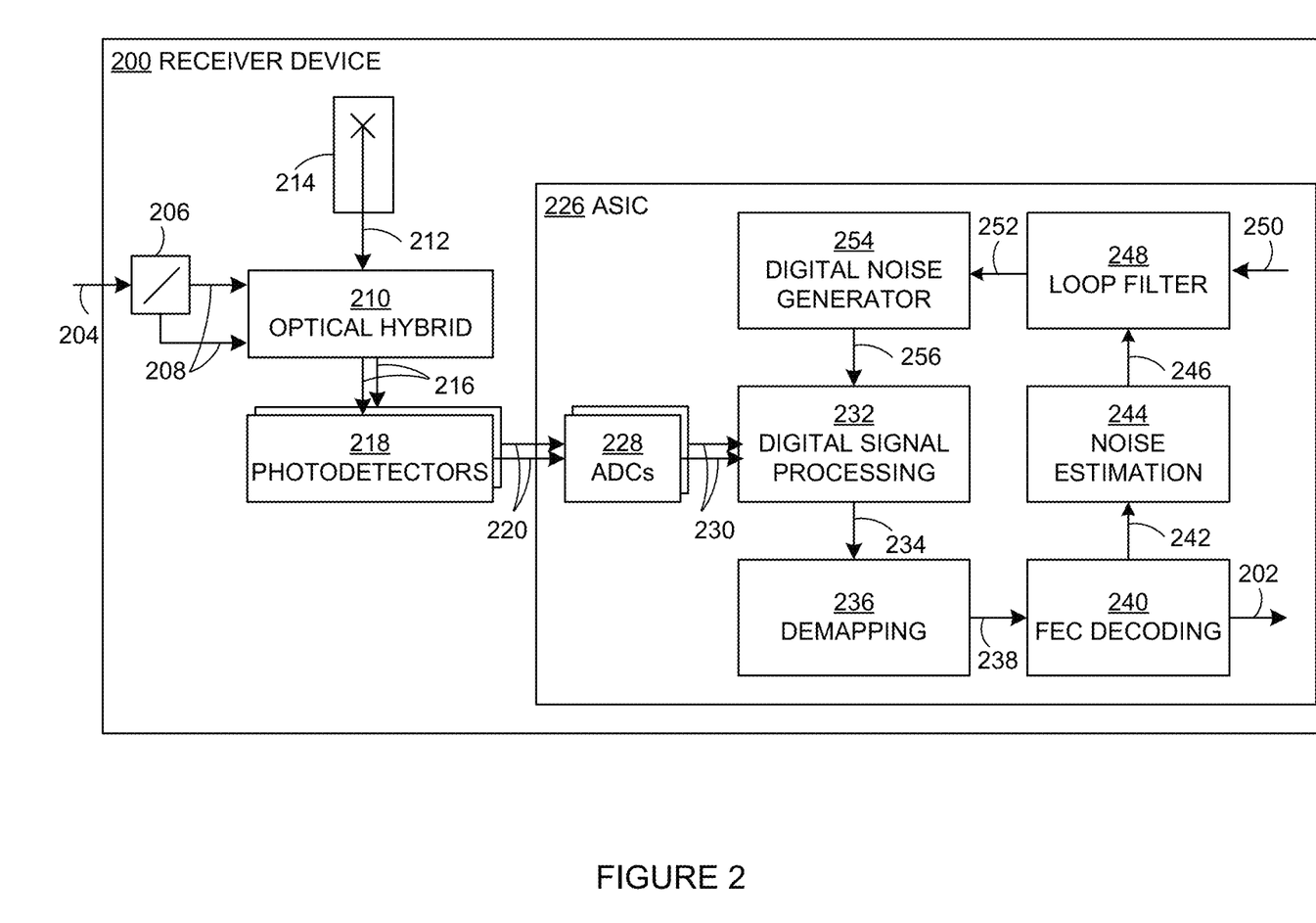
FIG. 2 illustrates an example receiver device in accordance with some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. The optical signal generated by the transmitter device may be representative of information bits (also referred to as client bits) which are to be communicated to the receiver device 200. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques such as polarization-division multiplexing (PDM), single polarization modulation, modulation of an unpolarized carrier, mode-division multiplexing, spatial-division multiplexing, Stokes-space modulation, polarization balanced modulation, and the like.

The receiver device 200 is configured to recover corrected client bits 202 from a received optical signal 204. The receiver device 200 may comprise a polarizing beam splitter 206 configured to split the received optical signal 204 into polarized components 208. According to one example, the polarized components 208 may comprise orthogonally polarized components corresponding to an X polarization and a Y polarization. An optical hybrid 210 is configured to process the components 208 with respect to an optical signal 212 produced by a laser 214, thereby resulting in optical signals 216. Photodetectors 218 are configured to convert the optical signals 216 output by the optical hybrid 210 to analog signals 220. According to one example, the analog signals 220 may comprise four signals corresponding, respectively, to the dimensions XI, XQ, YI, YQ, where XI and XQ denote the in-phase (I) and quadrature (Q) components of the X polarization, and YI and YQ denote the I and Q components of the Y polarization. Together, elements such as the beam splitter 206, the laser 214, the optical hybrid 210 and the photodetector 218 may form a communication interface configured to receive optical signals from other devices in a communication network, such as the network 100.

The receiver device 200 may comprise an application specific integrated circuit (ASIC) 226. The ASIC 226 may comprise analog-to-digital converters (ADCs) 228 which are configured to sample the analog signals 220, and to generate respective digital signals 230. Although illustrated as comprised in the ASIC 226, in an alternate implementation the ADCs 228 or portions thereof may be separate from the ASIC 226. The ADCs 228 sample the analog signals 220 periodically at a sample rate that is based on a signal received from a voltage-controlled oscillator (VCO) at the receiver device 200 (not shown).

The digital signals 230 generated by the ADCs 228 may comprise separate signals corresponding, for example, to each of the in-phase and quadrature components of the X and Y polarizations. The ASIC 226 is configured to apply digital signal processing 232 to each digital signal 230, thereby generating a respective processed signal 234. The processing 232 may comprise a plurality of operations including, for example, FFTs, IFFTs, multiple-input multiple-output (MIMO) filtering, FDM subcarrier de-multiplexing, high-frequency down-sampling, carrier recovery, and one or more equalization operations. Equalization refers to the general process of compensating for degradations in the digital signals 230, which may originate from time-varying impairments in the channel between the receiver device 200 and a transmitter device from which the optical signal 204 was transmitted. Equalization may involve the application of one or more filters to the digital signals 230, either in the time domain or the frequency domain or both, where the coefficients applied by the filters are designed to reduce bit errors on the symbols decoded by the receiver device 200. Various equalization operations may be used to achieve polarization recovery, distortion post-compensation, CD post-compensation, IQ delay compensation, carrier frequency offset recovery, and compensation of nonlinear impairments, such as those resulting from fiber nonlinearity or amplifier nonlinearity or both. The processed signal 234 may be representative of decoded symbols (also referred to as post-equalization symbols).

According to some examples, the one or more equalization operations applied to the digital signals 230 may include a least mean squares (LMS) control loop, also referred to as LMS update loop or LMS feedback loop. LMS control loops are described, for example, in WO2009/070881 to Roberts et al., herein incorporated by reference. In general, an equalizer that relies on a LMS control loop (also referred to as a LMS equalizer) may apply a cross-correlation between an input signal to the LMS equalizer and a signal representative of the decoded symbols following the LMS equalization. The LMS equalizer applies a filter to the input signal, and uses the result of the cross-correlation to incrementally adjust the filter coefficients from time to time in such manner as to reduce the error on the decoded symbols. The effective gain of the LMS equalizer depends on the symbol decision error rate.

According to some examples, the one or more equalization operations applied to the digital signals 230 may include compensation for the analog delay differential between the I and Q components of each polarization at the receiver, also referred to as IQ delay. The IQ delay may be sensitive to temperature and aging. For a given polarization, the I and Q components should be largely uncorrelated for modulation formats such as QPSK. Any IQ delay generated at the receiver device 200 may result in a degradation in performance, as well as a correlation between the I and Q components. Compensation for the IQ delay may be achieved using an IQ control loop, as described, for example, in U.S. Pat. No. 8,306,438 to Deczky et al., herein incorporated by reference. The IQ control loop may measure the correlation between the I and Q components of a given polarization, and may adjust the IQ delay so as to minimize the correlation. A stepping algorithm may be used to measure the BER, and to change the delay between the I and Q paths in such a manner as to reduce the BER. The IQ delay may be adjusted within the processing 232 by digitally shifting the I and Q signals relative to each other by some amount of time.

According to some examples, the one or more equalization operations applied to the digital signals 230 may include compensation for frequency offset between the transmitter laser frequency and the receiver laser frequency, also referred to as carrier frequency offset. The carrier recovery operation implemented in the processing 232 may generate an estimate of the carrier frequency offset. The frequency offset between the transmitter laser and the receiver laser may cause a rotation of the received symbols in the IQ plane, relative to the transmitted symbols. In addition, phase differences between the transmitter laser and the receiver laser, as well as those resulting from propagation through the network, may cause the received symbols to rotate in the IQ plane, relative to the transmitted symbols. This rotation may be detected by comparing the received symbols to estimates of the transmitted symbols, and calculating the phase difference in the IQ plane for each polarization. The loop filter in the carrier recovery feedback loop may filter the phase error estimates and determine a phase rotation that is to be applied to the incoming received symbols to minimize the error. These phase error estimates may also be used to estimate the frequency offset between the transmitter laser and the receiver laser. The estimate of the frequency offset may be used to pre-rotate the symbols with a time-dependent phase ramp to prevent the spinning/rotation in the IQ plane.

The processed signal 234 undergoes symbol-to-bit demapping 236 using a decision circuit, thereby resulting in a signal 238 representative of bit estimates. Where the received optical signal 204 is representative of symbols comprising FEC-encoded bits generated as a result of applying FEC encoding to client bits, the bit estimates 238 may further undergo FEC decoding 240 to recover the corrected client bits 202.

Accurate information about the noise in a communication network, such as the network 100, may be valuable for a variety of reasons. For example, noise measurements may be used to select the optimal transmission rate for a modem or to provide an indication of network health. In general, the ability to maximize the capacity of a network may require an accurate understanding of the noise environment in which the modems are operating.

The noise on the decoded symbols at a receiver, for example, the noise on the processed signal 234 at the receiver device 200, may be represented by an effective noise on the decoded symbols. The effective noise may be characterized, in linear units, by an effective noise to signal ratio (ENSR), or by an effective signal to noise ratio (ESNR), where ESNR=1/ENSR. ESNR may be converted to logarithmic dB units as $ESNR^{dB}=10 \cdot \log_{10} ESNR$, or from dB units back to linear units as $ESNR=10^{0.1 \cdot ESNR^{dB}}$. It may be possible to infer the $ESNR^{dB}$ (and thus $ENSR^{dB}$) on the processed signal 234 using the observed BER of the bit estimates 238 and a known relationship between BER and $ESNR^{dB}$, where the relationship is dependent on the modulation format used to map the bits to symbols. Specifically, $ESNR^{dB}$ is equivalent to the additive white Gaussian noise (AWGN) SNR in dB units at the input to the demapping 236 which, for the given modulation format, is expected to result in the observed BER. As shown schematically in FIG. 2, in addition to outputting the corrected client bits 202, the FEC decoding 240 may be configured to generate a BER estimate 242. A noise estimation process 244 may be applied to the BER estimate 242 to generate a relative noise estimate 246. The relative noise estimate 246, which may be represented by the $ENSR^{dB}$, is an estimate of noise, relative to signal, on the decoded symbols 234. The noise estimation 244 may be implemented inside the ASIC 226 or with a processor on a separate chip inside the receiver device 200. The noise estimation 244 takes into account that the relationship between BER and effective noise is dependent on the current modulation format. For example, for each possible modulation format, the relationship between BER and ENSR may be precalculated and stored in firmware of the receiver device 200 such that the relationship is able to inform the noise estimation process 244. According to some examples, the relationship between BER and $ENSR^{dB}$ may be represented with a look-up table (LUT), or with a fit function such as a polynomial where the coefficients are predetermined for each different modulation format.

There are two broad contributors to the effective noise on decoded symbols at a receiver: implementation noise and external noise. Implementation noise may be understood to refer to the internal noise and/or distortion contributions from the transmitter/receiver pair, while external noise may be understood to refer to noise and/or interference contributions that are attributable to sources outside the transmitter/receiver pair (i.e., noise and/or interference contributions from the communication channel between the transmitter and the receiver). According to one example, external noise may be attributed to ASE from amplifiers in a link between an optical transmitter and an optical receiver, as well as nonlinear noise resulting from nonlinear interactions within and between channels during propagation. Implementation noise may be characterized by a NSR value $NSR_{IMP}$, or by a SNR value $SNR_{IMP}$, where $SNR_{IMP}=1/NSR_{IMP}$. External noise may be characterized by a NSR value $NSR_{EXT}$, or by a SNR value $SNR_{EXT}$, where $SNR_{EXT}=1/NSR_{EXT}$. Similarly to ENSR, $NSR_{IMP}$ and $NSR_{EXT}$ may each be converted to logarithmic dB units as $NSR_{IMP}^{dB}=10\cdot\log_{10} NSR_{IMP}$ and $NSR_{EXT}^{dB}=10\cdot\log_{10} NSR_{EXT}$, respectively.

Sources of implementation noise at the receiver device 200 may include frequency drift and phase noise from the laser 214, non-idealities in the optical hybrid 210 (such as those resulting in inter-channel crosstalk, IQ power imbalance, IQ quadrature error, and IQ delay), thermal noise and shot noise from the photodetectors 218, quantization noise and distortion from the ADCs 228, and quantization and rounding errors in the processing 232. Adaptive filters, such as those used in the processing 232, may also contribute implementation noise at the receiver device 200. According to some examples, an adaptive filter (not shown) may use a control loop to reduce noise on the processed signal 234. Control loops often rely on estimates of noise on the received symbols which are calculated from the difference between the received symbols and estimates of the transmitted symbols.

Noise on the processed signal 234 may also be contributed by implementation noise at the transmitter device. Sources of implementation noise at the transmitter device may include noise from quantization and rounding errors, quantization noise and distortion from digital-to-analog converters (DACs), additive white thermal noise and nonlinear distortion from amplifiers, frequency drift and phase noise from the transmitter laser, and non-idealities in the electrical-to-optical (E/O) modulators, such as errors in the balance between I and Q modulators, the impact of the finite extinction ratio, and the nonlinearity of the E/O modulator response.

Further examples of implementation noise which may be contributed by the transmitter and the receiver are described by Hui et al. in "Fiber Optic Measurement Techniques," Academic Press, 2008.

In U.S. patent application Ser. No. 16/721,747 filed Dec. 19, 2019, incorporated by reference herein, Shiner et al. describe techniques for estimation of external noise in a communication channel. According to one example, where NSR values are used to characterize the implementation noise, the external noise, and the effective noise, the relationship between the values may be expressed in linear units by Equation 1:

$$ENSR=EC\cdot(NSR_{EXT}+NSR_{IMP}), \qquad [1]$$

where ENSR denotes the effective NSR, where $NSR_{EXT}$ denotes the external NSR, where $NSR_{IMP}$ denotes the implementation NSR, and where EC denotes an eye closure parameter which reflects noise enhancement. Due to the intrinsic sources of noise at the transmitter and the receiver, $NSR_{IMP}>0$. Thus, even in a theoretical scenario where $NSR_{EXT}=0$, it is expected that ENSR>0 due to the fact that $NSR_{IMP}>0$. In most cases the eye closure parameter EC has a value greater than one, that is EC>1, such that one unit of noise added to the signal during propagation from the transmitter to the receiver will result in more than one unit of noise observed on the received symbols post-equalization. The precise value of the eye closure parameter EC may depend on different factors which contribute to noise enhancement. For example, as described previously, the efficacy of control loops (such as those used in the processing 232) may be affected by decision errors, which may increase with $NSR_{EXT}$ and $NSR_{IMP}$. In another example, implementation noise may be contributed by the transmitter device in the form of distortion. At the receiver device 200, the processing 232 may partially correct this distortion by applying transformations to the received optical signal 204, where the transformations attempt to minimize the total noise on the decoded symbols. However, in so doing, the transformations may also enhance additive noise from the line. This enhancement would be reflected by the eye closure parameter EC.

As described by Shiner et al. in U.S. Ser. No. 16/721,747, the relationship between ENSR and $NSR_{EXT}$ may be represented in other ways and using alternative and/or additional variable parameters. Based on the representation of the relationship and the applicable values of the variable parameters, an estimate of ENSR may be used to calculate an estimate of $NSR_{EXT}$.

The ability to accurately estimate $NSR_{EXT}$ may be valuable. For example, this information may be used to select the optimal transmission rate for maximizing network capacity or to provide an indication of network health.

As previously described, the noise estimation process 244 may be used to infer a value of ENSR on the processed signal 234 based on the BER estimate 242 generated by the FEC decoding 240.

It has been noted that the processing 232 may implement various control loops, such as a LMS control loop, an IQ control loop, and a carrier recovery loop. It may be shown that, when noise on the digital signals 230 is very low noise, these control loops may become unstable. For example, as previously noted, the effective gain of the LMS equalizer is dependent on the symbol decision error rate. When SNR is very high (i.e., noise is very low), there are effectively very few decision errors, which results in a high LMS gain. A high LMS gain may cause the LMS equalizer to become unstable and may lead to oscillations in the LMS control loop. These oscillations may introduce a correlation between the I and Q components of a given polarization, which may impact the stability of the IQ control loop. Furthermore, when SNR is very high, the BER feedback used by the IQ control loop may be insufficient to optimize the IQ delay to a desired precision. As previously noted, phase differences between the transmitter laser and the receiver laser, as well as phase rotation resulting from non-linear propagation effects, may be compensated by a carrier recovery feedback loop. In some examples, this loop may derive estimates of the phase error within a given polarization from the angle between a received symbol and an estimate of the transmitted symbol in the IQ plane. A feedback loop may then work to rotate the received symbols to minimize the error. The choice of gain for this feedback loop may be optimal for a given error rate and may be excessive at high SNR.

Figure 3:
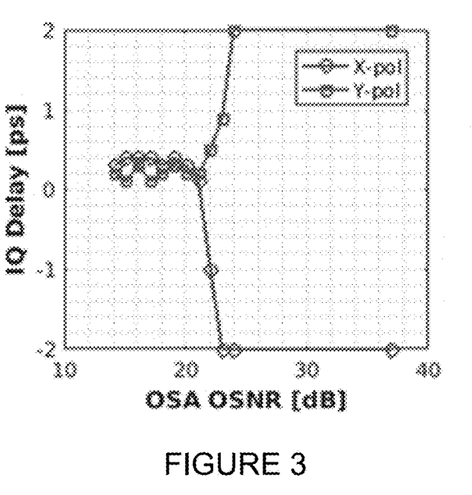
FIG. 3 illustrates a time delay, as calculated using a control loop at a receiver, to be applied between in-phase (I) and quadrature (Q) components of an optical signal at the receiver, where the time delay is plotted as a function of the optical signal to noise ratio (OSNR) measured by an optical spectrum analyzer (OSA) located between a transmitter and the receiver.
Figure 4:
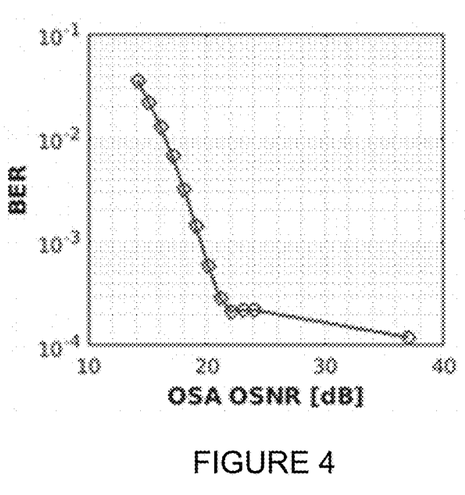
FIG. 4 illustrates a bit error rate (BER) measured at a receiver from an optical signal, where the BER is plotted as a function of the OSNR measured by an OSA located between a transmitter and the receiver.
Figure 5:
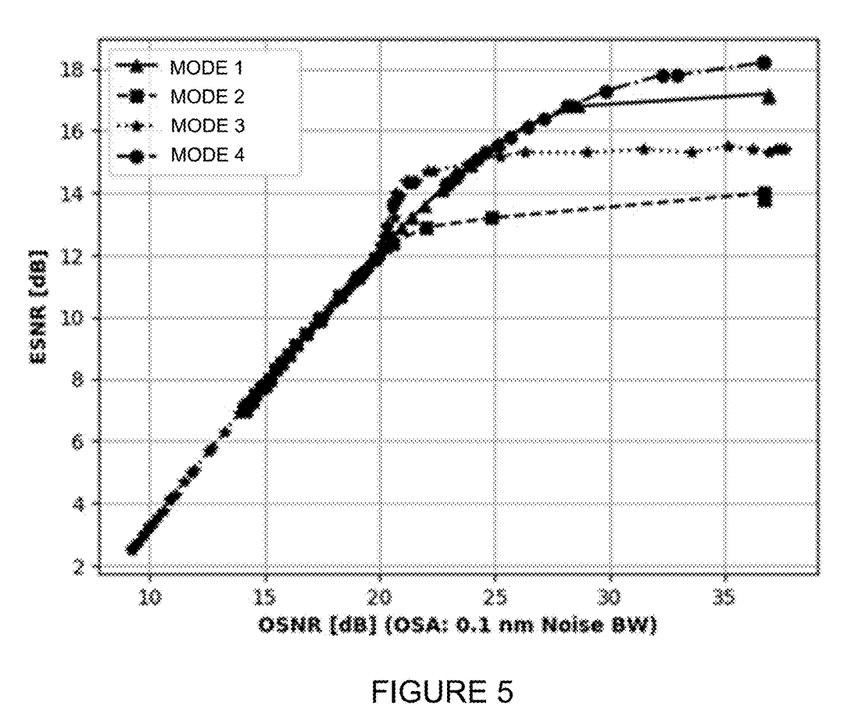
FIG. 5 illustrates an effective signal to noise ratio (ESNR) calculated at a receiver from optical signals transmitted using four different transmission modes, where the ESNR is plotted as a function of the OSNR measured by an OSA located between a transmitter and the receiver.

The plots illustrated in FIGS. 3, 4, and 5 were generated in a laboratory using an optical receiver connected to an optical transmitter via an intermediate source of optical noise. Optical signals were transmitted in four different transmission modes, denoted modes 1-4, where each transmission mode defines a set of modem operating parameters which may include the modulation format. The amplitude of the optical noise was varied over a range of optical signal to noise ratio (OSNR) values as measured by an optical spectrum analyzer (OSA) located between the transmitter and the receiver. The results for all four modes are illustrated in FIG. 5, while FIGS. 3 and 4 illustrate the results for mode 2 only.

FIG. 3 illustrates an IQ delay (in picoseconds or ps), as calculated by an IQ control loop at a receiver, to be applied between the I and Q components for each of the X and Y polarizations of the optical signal transmitted using mode 2, where the delay is plotted as a function of the OSNR (in dB). For OSNR values lower than approximately 22 dB, the IQ delay for each polarization is relatively stable. However, as the OSNR value increases above 22 dB (i.e., when the noise becomes very low), the IQ control loop becomes unstable and saturates at its control limits of ±2 ps. This saturation may be the result of instability in the receiver's LMS control loop, which occurs when the rate of decision errors is very low, such that the effective LMS gain is very high. The IQ delay values of −2 ps for the X polarization and +2 ps for the Y polarization may result in a sudden increase in BER. Given that the OSNR value is already very high, the receiver is far from failure and the increase in BER may be considered negligible. However, the IQ control loop may take several minutes to respond to the sudden change in BER, which may result in a reduced margin and limited capacity to respond to transient events.

FIG. 4 illustrates a BER measured at a receiver from the optical signal transmitted using mode 2, where the BER is plotted as a function of the OSNR (in dB). For OSNR values lower than approximately 22 dB, the BER steadily decreases as the OSNR increases. However, as the OSNR value increases above 22 dB, the BER quickly begins to level out. That is, for very low noise values, the BER approaches a floor. This flooring behaviour is the result of oscillation in the LMS control loop, which causes the processing 232 itself to generate some noise on the processed signal 234. That is, oscillation of the LMS control loop leads to an increase in the BER. As the BER increases, the LMS control loop becomes more stable and the oscillation is reduced. A dynamic equilibrium may be reached wherein the noise generated as a result of the oscillation is just enough to stabilize the LMS control loop. This dynamic equilibrium may result in a BER that is largely insensitive to changes in external noise when SNR is very high. In this high-SNR regime, changes in external noise may be compensated by changes in noise from LMS oscillation to maintain a nearly constant BER. The BER effectively approaches a lower limit or floor at very high OSNR values, as shown in FIG. 4.

FIG. 5 illustrates $ESNR^{dB}$ calculated at a receiver from optical signals transmitted using transmission modes 1-4, where the $ESNR^{dB}$ is plotted as a function of the OSNR (in dB) measured by an OSA located between a transmitter and the receiver. The $ESNR^{dB}$ values are calculated using a noise estimation process, such as the process 244, based on the BER estimates generated at the receiver. As previously noted, the calculation of $ESNR^{dB}$ from BER may be performed using a known relationship that is dependent on the modulation format of the optical signal. Some modulation formats may be substantially unaffected by control loop instability at high SNR. For example, the curve for mode 4 in FIG. 5 exhibits a smooth roll-off at high OSNR values, as would be expected for a modulation format whose noise response is well described, for example by appropriate values of implementation noise $NSR_{IMP}$ and eye closure EC. Other modulation formats, however, may exhibit the effects of control loop instability as OSNR increases. For example, the curves for modes 2 and 3 in FIG. 5 exhibit substantial saturation as OSNR increases above approximately 20 dB. The $ESNR^{dB}$ saturation exhibited by the curve for mode 2 reflects the BER saturation illustrated in FIG. 4. Due to the oscillation of the LMS control loop, the BER approaches a floor even as the noise outside the receiver continues to decrease. Since $ESNR^{dB}$ is calculated from BER using a modulation format-dependent transduction, $ESNR^{dB}$ approaches a ceiling (corresponding to the BER floor) even as the noise outside the receiver continues to decrease. In other words, in the high-SNR regime, the effective noise may become largely insensitive to external noise. As a consequence, the relationship between ESNR and $SNR_{EXT}$ may become unclear. For example, in a low-SNR regime (e.g., OSNR<20 dB), the relationship between ENSR and $NSR_{EXT}$ might be accurately expressed using Eq. 1 and assuming specific values of $NSR_{IMP}$ and EC. However, in a high-SNR regime (e.g., OSNR>20 dB), that same relationship may no longer be accurate, since a change in $NSR_{EXT}$ may have little to no impact on ESNR. This may limit the ability to estimate external noise from effective noise in the high-SNR regime.

In U.S. Pat. No. 9,774,394, Harley et al. describe techniques for digital noise loading. For example, a digital noise generator may use one or more filters to add white Gaussian noise to a communication signal at a coherent optical receiver, causing a deterministic reduction in signal quality of the signal as processed by the DSP. In some embodiments, the noise may be non-white and/or non-Gaussian. According to some examples, the DSP may contain two sets of filters, static and dynamic. The generated noise may be added to the signal by augmenting it on to the static filter in the DSP. This noise may be made dependent on the filter coefficients, and accordingly, distributed such that its effect on the signal does not change with varying filter coefficients. Depending on the structure of the static filter, the noise may be added in a manner so that the dynamic filter in the DSP does not compensate for it.

In U.S. Pat. No. 7,561,797, Harley et al. describe a method of generating a degraded optical signal at a transmitter for transmission to a receiver over an optical link for the purpose of controlling the SNR of the optical signal at a receiver. The degraded optical signal is generated at the transmitter based on a compensation function adapted to compensate impairments of the optical link and a predetermined degradation function f(t). According to one example, the degradation function f(t) is applied directly to a compensation function c(t) used to precompensate optical impairments in the link. In this case, the degradation function f(t) can be considered as a known error in the compensation function c(t), so that the optical signal at the receiver retains a known amount of residual (uncompensated) distortion. In some embodiments, the degradation function f(t) may be provided as an offset of one or more link parameters. According to some examples, the optical transmitter may include a digital noise generator which operates to generate a degradation signal having a desired strength and spectral characteristics, in accordance with the desired degradation function f(t). Digital combiner blocks may insert the degradation signal into the multi-bit sample streams. The resulting degraded sample streams may then be processed through DACs and analog signal paths to yield degraded drive signals which are used to modulate the carrier signal. The digital noise generator may be implemented using various methods. The degradation signal may comprise any desired combination of amplitude and/or phase variations.

It is herein proposed that noise may be added during digital signal processing at a receiver. The addition of noise may stabilize the operation of one or more control loops at the receiver. For example, a sufficient amount of noise may be injected into the processing such that the rate of symbol decision errors does not fall below a minimum value, thereby ensuring that the effective gain of a LMS equalizer is low enough to avoid or limit oscillation of the LMS control loop. In another example, the addition of noise during the processing may achieve sufficient BER feedback needed for the IQ control loop to optimize the IQ delay to a certain precision, thereby improving performance. According to some examples, the injection of digital noise into the processing at the receiver may be done for the purpose of achieving more accurate measurements, such as measurements of effective noise and external noise. According to one example, the injected noise may be calibrated such that its contribution may be removed when estimating external noise from effective noise.

Returning to FIG. 2, the ASIC 226 may be configured to implement a loop filter 248 and a digital noise generator 254. The loop filter 248, which will be described in more detail with respect to FIG. 6, may be applied to the relative noise estimate 246 and to a target 250 in order to calculate an amount of digital noise loading desired on the processed signal 234. The loop filter 248 may send an instruction or control signal 252 to the digital noise generator 254, where execution of the instruction 252 causes the digital noise generator 254 and the digital signal processing 232 to work together to load an amount of digital noise into the digital signal processing 232. As described, for example, by Harley et al. in U.S. Pat. No. 7,561,797 or 9,774,394, there are a variety of mechanisms by which noise may be introduced into the digital signal processing 232 such that the processed signal 234 is loaded with additional noise. For example, based on the signal 252 received from the loop filter 248, the digital noise generator 254 may inject a specific amount of noise into the digital signal processing 232. Alternatively, the digital noise generator 254 may provide an instruction 256 to the digital signal processing 232, where execution of the instruction 256 causes the digital signal processing 232 to apply one or more adjustments to how the digital signals 230 are processed, where the adjustments cause noise to be loaded onto the processed signal 234. For example, responsive to a relative noise amount indicated in the instruction 252, the digital noise generator 254 may determine (for example, from a look-up-table) that, in order to increase the noise on the processed signal 234 by that relative noise amount, a specific perturbation should be applied to a coefficient of a filter implemented by the digital signal processing 232. The digital noise generator 254 may send the instruction 256 to the digital signal processing 232 to apply the specific perturbation to the filter coefficient. As a result of the applying the perturbation, the relative noise on the processed signal 234 generated by the digital signal processing 232 may increase by the relative noise amount. Certain control loops may traditionally be configured to adapt the filter to remove or compensate for such perturbations. In this case, the control loop may be appropriately modified to ensure that the perturbation is not removed, and the requested noise is loaded onto the processed signal 234.

Figure 6:
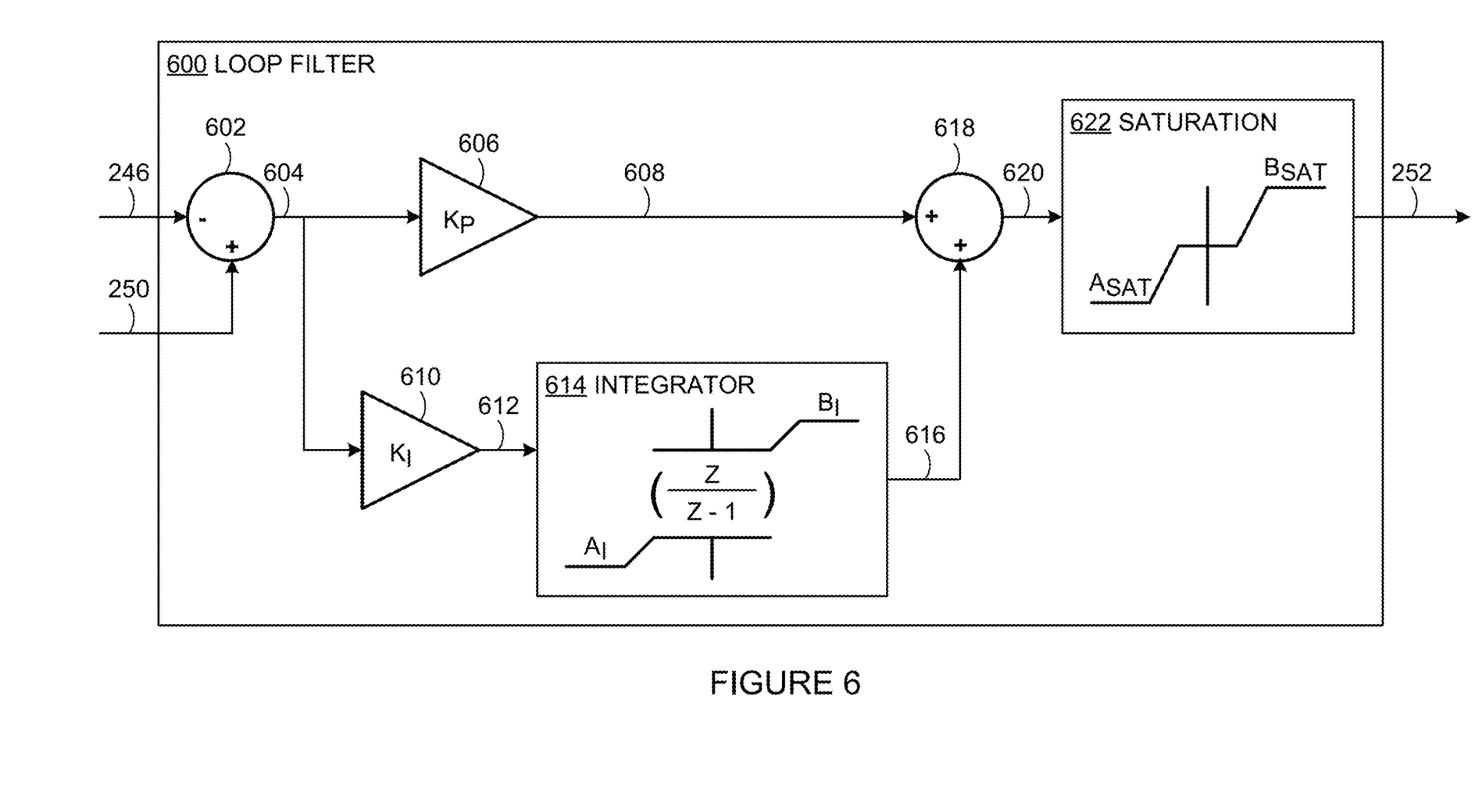
FIG. 6 illustrates an example loop filter in accordance with some examples of the technology disclosed herein.

FIG. 6 illustrates an example loop filter 600, in accordance with some examples of the technology disclosed herein. The loop filter 600 employs a proportional-integral (PI) controller, and represents one possible implementation of the loop filter 248 illustrated in FIG. 2.

For the purpose of this example, the relative noise estimate 246, the target 250, and the control signal 252 are all represented within the loop filter 600 in linear units. The relationship between linear and dB units was described earlier. Units are quoted in linear or dB units throughout this text, as appropriate, but should be interpreted as the corresponding linear units for the operation of the loop filter 600. Alternative loop filter designs are contemplated which represent all or some signals in logarithmic dB units, or other units.

The first step of the loop filter 600 involves a comparison between the relative noise estimate 246 and the target 250. A difference operation 602 calculates an error signal 604 representing the difference between the target 250 and the relative noise estimate 246. Where the relative noise estimate 246 is an ENSR estimate, the target 250 may comprise a minimum ENSR value, below which at least one control loop implemented by the digital signal processing 232 is expected or observed to be unstable. For example, referring to the optical signal transmitted using mode 2, the curve in FIG. 5 suggests that the target 250 could be set to ENSR=0.0631 (ENSR$^{dB}$=−12 dB, which corresponds to ESNR$^{dB}$=12 dB). The control signal 252 generated by the loop filter 600 may indicate a relative amount of digital noise, NSR$_d$, to be loaded into the processing 232, where the amount NSR$_d$ is based, in part, on the difference between the relative noise estimate 246 and the target 250, as will be described in more detail below. In general, as long as the relative noise estimate 246 differs from the target 250, each new iteration the loop filter 600 may cause a new relative amount of digital noise NSR$_d$ to be loaded into the digital signal processing 232, where the new amount NSR$_d$ results in a subsequent ENSR estimate 246 that is closer to the target 250 than the ENSR estimate 246 from a previous iteration of the loop filter 600.

According to some examples, the target 250 may be stored in a memory of the receiver device 200. The target 250 may vary based on transmission mode, including parameters such as modulation format and choice of LMS gain. According to some examples, during modem development a plurality of target values may be determined corresponding to a plurality of different transmission modes, and the plurality of target values may be stored at the receiver device 200. The target 250 used by the loop filter 248 may be selected from the plurality of target values based on the current transmission mode.

The error signal 604 may be provided to two parallel amplifiers 606 and 610. The amplifier 606 may generate a scaled error signal 608 with a proportional gain K$_P$, while the amplifier 610 may generate a scaled error signal 612 with an integral gain K$_I$. An integrator 614, denoted in FIG. 6 in the z-transform domain by the function z/(z−1), may be applied to the scaled error signal 612 to generate an accumulated signal 616 which is proportional to the scaled error signal 612 integrated over time. The integrator 614 may comprise a lower saturation limit A$_I$, and an upper saturation limit B$_I$, such that the accumulated signal 616 has a minimum value A$_I$, and a maximum value B$_I$. According to some examples, B$_I$ may be infinite (i.e., no limit) or some other positive value. Negative values for the scaled error signal 612 cause the accumulated signal 616 to decrease. According to some examples, the integrator 614 may stop integrating the scaled error signal 612 once the integral (i.e., the accumulated signal 616) drops below some threshold, for example A$_I$=0.

The accumulated signal 616 generated by the integrator 614 is added to the scaled error signal 608, as denoted by the addition operation 618, thereby resulting in a signal 620. According to some examples, a saturation operation 622 may be applied to the signal 620, such that the relative noise amount indicated in the signal 252 has a minimum value A$_{SAT}$ and a maximum value B$_{SAT}$. To ensure that the relative noise amount does not drop below zero, the value of $A_{SAT}$ may be set to zero. According to some examples, $B_{SAT}$ may be infinite (i.e., no limit) or some other positive value.

In the event that the ENSR estimate 246 is lower than the target 250, the error signal 604 is positive. This is an indication that more noise may be required for stable operation of at least one control loop implemented at the receiver. Accordingly, subject to the maximum value $B_{SAT}$, the control signal 252 will indicate a relative digital noise amount $NSR_d$ that is greater than an amount indicated in a previous iteration of the loop filter 600. In this example, the precise amount $NSR_d$ indicated in the signal 620 is a function of the current positive error signal 604, in addition to information that has been accumulated in the integrator 614 from prior iterations (i.e., the previous value of the accumulated signal 616), subject to the upper saturation limit $B_f$.

In the event that the ENSR estimate 246 is greater than the target 250, the error signal 604 is negative. This is an indication that the current relative digital noise amount $NSR_d$ being loaded onto the digital signal processing 232 may be sufficient for stable operation of control loops implemented at the receiver, and that the relative digital noise amount $NSR_d$ may actually be decreased, while still maintaining sufficient noise loading for control loop stability. Accordingly, subject to the minimum value $A_{SAT}$, the control signal 252 may indicate a relative digital noise amount $NSR_d$ that is lower than an amount indicated in a previous iteration of the control loop 600. In this example, the precise amount $NSR_d$ indicated in the signal 620 is a function of the current negative error signal 604, in addition to information that has been accumulated in the integrator 614 from prior iterations, subject to the lower saturation limit $A_f$.

In the event that the ENSR estimate 246 is equal to the target 250, the error signal 604 is zero. This is an indication that the current relative digital noise amount $NSR_d$ being loaded onto the digital signal processing 232 may be sufficient, but not excessive, for stable operation of control loops implemented at the receiver. With the scaled signal 608 and 610 being zero, the signal 620 is proportional to the accumulated signal 616, which remains unchanged since the previous iteration of the loop filer 600. Accordingly, subject to the limits $A_{SAT}$ and $B_{SAT}$, the control signal 252 may indicate a relative digital noise amount $NSR_d$ that is unchanged from an amount indicated in a previous iteration of the control loop 600. In this example, the precise amount $NSR_d$ indicated in the signal 620 is a function of the accumulated signal 616, which has reached a constant value. In this state, the loop filter 600 is effectively at equilibrium, such that the relative digital noise amount $NSR_d$ being called for by the control signal 252 results in an ENSR estimate 246 that matches the target 250. Given steady channel conditions, it may take several iterations of the loop filter 600 before this equilibrium is reached. Once the loop filter 600 is in an equilibrium state, any change in channel conditions may result in a new value of the ENSR estimate 246, followed by a new relative digital noise amount $NSR_d$ being called for in the control signal 252 for the purpose of reaching a new equilibrium, where each new ENSR estimate 246 matches the target 250.

The loop filter 600 is merely one example of the loop filter 248. Alternative implementations are contemplated. For example, the loop filter 248 may be implemented using any classical feedback mechanism, such as a proportional (P) controller, a proportional-integral-derivative (PID) controller, a proportional-derivative (PD) controller, and the like.

Figure 7:
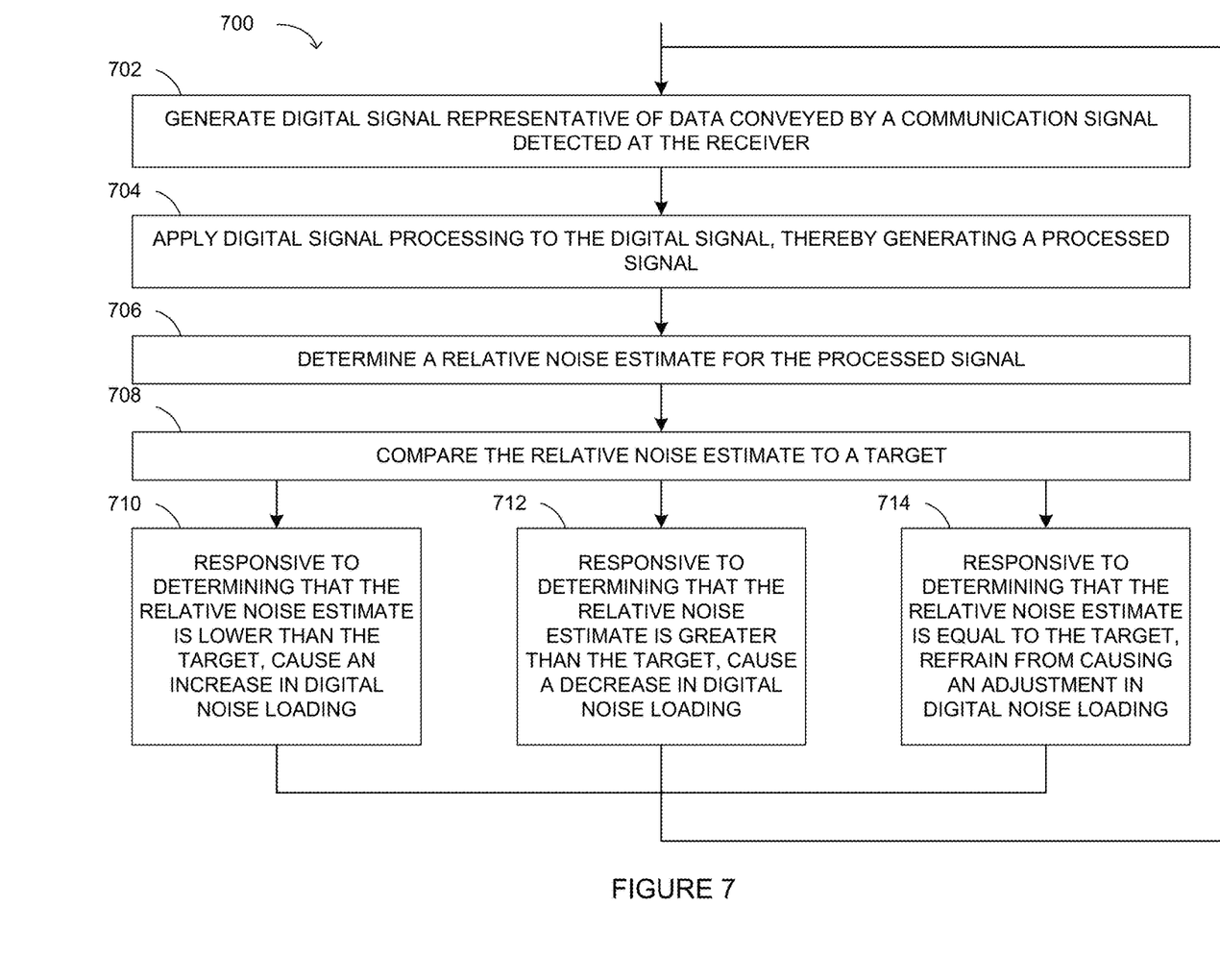
FIG. 7 illustrates an example method for digital noise loading in accordance with some examples of the technology disclosed herein.

FIG. 7 illustrates an example method 700 for digital noise loading, in accordance with some examples of the technology disclosed herein. The method 700 may be implemented at a receiver, such as the receiver device 200.

At 702, the receiver may generate a digital signal representative of data conveyed by a communication signal detected at the receiver. For example, as described with respect to FIG. 2, the digital signals 230 may be generated based on the optical signal 204 using the various components of the communication interface of the receiver device 200, together with the ADCs 228. It should be understood that the action at 702, as well as the subsequent actions in the method 700, may be performed iteratively over time. For example, new digital signals may be generated continuously, based on newly received data conveyed by the communication signal.

At 704, the receiver may apply processing to the digital signal generated at 702, thereby generating a processed signal. For example, as described with respect to FIG. 2, the ASIC 226 of the receiver device 200 may apply the digital signal processing 232 to the digital signals 230, thereby generating the processed signal 234.

At 706, the receiver may determine a relative noise estimate for the processed signal, where the relative noise estimate is representative of an amount of noise relative to an amount of signal. For example, as described with respect to FIG. 2, the FEC decoding 240 implemented by the receiver device 200 may generate the BER estimate 242. Additionally, the noise estimation process 244 may be applied to the BER estimate 242 to generate the relative noise estimate 246. According to some examples, the relative noise estimate determined at 706 may comprise a BER estimate, an ENSR value inferred from a BER estimate, or some other value that is representative of a relative amount of noise on the processed signal 234.

At 708, the receiver may compare the relative noise estimate determined at 706 to a target. According to some examples, the target may comprise a relative noise value greater than a maximum relative noise value associated with instability of at least one control loop implemented by the processing. For example, referring to FIG. 5, the maximum ENSR value associated with control loop instability for the optical signal transmitted using mode 2 is approximately −12 dB. (There is no apparent saturation of $ESNR^{dB}$ values below 12 dB, thereby suggesting that the noise is high enough in this range to maintain the stability of the control loops.) Accordingly, the target ENSR value could be set to some value $ENSR_{TARG}$ that is greater than 0.0631 (−12 dB), such as $ENSR_{TARG}$=0.1259 ($ENSR_{TARG}^{dB}$=−9 dB). According to some examples, where the relative noise determined at 706 is expressed in units other than ENSR or $ENSR^{dB}$, such as Bit Error Ratio (BER), the target may also be expressed in the same units as the relative noise.

Based on the comparison performed at 708, the receiver may load an amount of digital noise into the digital signal processing, such that a subsequent iteration of the method 700 results in a subsequent processed signal generated at 704 being loaded with the amount of digital noise.

In one example, based on the comparison at 708, the receiver may determine that the relative noise estimate is lower than the target. This determination may be made within a loop filter, such as the loop filter 248 which is applied to the relative noise estimate 246 and to the target 250. Referring to the example loop filter 600, where the difference operation 602 results in a positive value of the error signal 604, this may represent the determination that the relative noise estimate 246 is lower than the target 250.

For example, given $ENSR_{TARG}=0.1259$ ($ENSR_{TARG}^{dB}=-9$ dB), if the ENSR estimate determined at 706 is 0.0501 (−13 dB) (corresponding to $ESNR^{dB}=13$ dB in FIG. 5, where control loop instability is clearly present), the receiver may determine that the relative noise estimate is lower than the target. Responsive to this determination, the receiver may cause an increase in digital noise loading, as shown at 710. For example, as described previously, the loop filter 248 may generate an instruction 252 comprising an indication of a relative digital noise amount $NSR_d$ that is greater than a relative digital noise amount indicated in a previous instruction 252. The precise amount $NSR_d$ may be based, in part, on the difference between noise estimate 246 and the target 250 (e.g., the positive error signal 604 generated in the loop filter 600). The additional requested noise may be loaded onto the processed signal through the combined actions of the digital noise generator 254 and the digital signal processing 232. The noise loading may be achieved, for example, by the digital noise generator 254 sending an instruction 256 to the digital signal processing 232, as described previously, where the instruction 256 causes the processing 232 to apply one or more perturbations designed to increase noise in the processed signal 234. For example, the one or more perturbations may comprise any one or more of an adjustment of a filter comprised in the digital signal processing 232, such as a CD compensation filter, an addition of random noise to one or more signals within the digital signal processing 232, a degradation of clock recovery performance, and the like.

In another example, based on the comparison at 708, the receiver may determine that the relative noise estimate is greater than the target. For example, the receiver may determine that an ENSR estimate of 0.1585 (−8 dB) (corresponding $ESNR^{dB}=8$ dB in FIG. 5) is greater than $ENSR_{TARG}=0.1259$ ($ENSR_{TARG}^{dB}=-9$ dB). Referring to the example loop filter 600, where the difference operation 602 results in a negative value of the error signal 604, this may represent the determination that the relative noise estimate 246 is greater than the target 250. Responsive to this determination, the receiver may cause a decrease in digital noise loading, as shown at 712. For example, as described previously, the loop filter 248 may generate an instruction 252 comprising an indication of a relative digital noise amount $NSR_d$ that is lower than a relative digital noise amount indicated in a previous instruction 252. The precise amount $NSR_d$ may be based, in part, on the difference between noise estimate 246 and the target 250 (e.g., the negative error signal 604 generated in the loop filter 600). The instruction 252 may be executed through the combined actions of the digital noise generator 254 and the digital signal processing 232. For example, the reduction in noise loading may be achieved by the digital noise generator 254 sending an instruction 256 to the digital signal processing 232, where the instruction 256 causes the processing 232 to decrease or remove a perturbation that is currently being applied to the digital signal processing 232 for the purpose of digital noise loading. According to some examples, the amount by which the digital noise loading is able to be decreased at 712 may be limited by a lower bound $A_{SAT}=0$, corresponding to $NSR_d=0$ (i.e., no digital noise loading).

In another example, based on the comparison at 708, the receiver may determine that the relative noise estimate is substantially equal to the target. Referring to the example loop filter 600, where the difference operation 602 results in the error signal 604 having a value of approximately zero, this may represent the determination that the relative noise estimate 246 is substantially equal to the target 250. Responsive to this determination, the receiver may refrain from causing an adjustment in digital noise loading, as shown at 714. For example, the loop filter 248 may generate an instruction 252 comprising an indication of a relative digital noise amount $NSR_d$ that is equal to a relative digital noise amount indicated in a previous instruction 252. The precise amount $NSR_d$ may be based on the accumulated signal 616, which remains at a constant value as long as the error signal 604 is zero. Where the instruction 252 indicates that the relative digital noise amount $NSR_d$ is to remain unchanged from a previous value, the digital noise generator 254 may send an instruction 256 to the digital signal processing 232, where the instruction 256 causes the processing 232 to refrain from modifying a perturbation that is currently being applied to the digital signal processing 232 for the purpose of digital noise loading. Under these circumstances, the loop filter 248 (600) is in an equilibrium state, and the amount of digital noise loading currently being applied by the digital signal processing is sufficient for the relative noise estimate to approximately match the target.

As illustrated in FIG. 7, following the increase in digital noise loading (710), or the bounded decrease in digital noise loading (712), or the absence of any adjustment to the digital noise loading (714), the method 700 may be repeated such that a new digital signal is generated at 702, and a new processed signal is generated at 704, either with increased digital noise loading, decreased digital noise loading, or no change in digital noise loading, relative to a previous iteration of the method 700. A new relative noise estimate may be determined at 706, and, based on the comparison between the new relative noise estimate and the target at 708, the receiver may cause the amount of digital noise loading to increase (710) or decrease (712) or remain unchanged (714).

As a consequence of the method 700, one or more control loops implemented in the receiver device may operate with more stability. This increase in stability may achieve performance improvements such as improved capacity for tracking fast polarization transients. For example, in the case of an IQ control loop that has saturated due to a high SNR, the associated performance degradation may pose problems in the event of an abrupt change in the noise from the line, for example, when a large number of channels are suddenly added. Such problems may be avoided by loading enough digital noise to avoid erratic behaviour of the IQ control loop. Furthermore, eliminating or reducing control loop oscillation may enable more accurate measurements of certain noise parameters.

For example, in the event that the ENSR estimate in the absence of digital noise loading is determined to be $ENSR^{dB}=-13$ dB (which is equivalent to ENSR=0.0501 in linear units), and the target is selected to be $ENSR_{TARG}^{dB}=-9$ dB (which is equivalent to $ENSR_{TARG}=0.1259$), the receiver may determine that additional digital noise is needed. The control signal 252 may indicate that additional digital noise should be loaded onto incoming signals as they enter the digital signal processing 232. With each iteration of the method 700, a new estimate of ENSR is determined in the presence of the digital noise loaded as a result of the comparison performed during the previous iteration. An ENSR estimate in the presence of digital noise loading may be referred to as a loaded ENSR estimate. Once a loaded ENSR estimate is obtained that is approximately equal to or greater than the target $ENSR_{TARG}$, the receiver may be deemed to be operating with sufficient noise for stable operation of its control loops. For this example, where $ENSR<ENSR_{TARG}$, the relative amount of digital noise $NSR_d$ that would be required to increase the ENSR from the initial estimate of ENSR=0.0501 (i.e., absent digital noise loading) to the target of $ENSR_{TARG}=0.1259$ may be calculated using Equation 2:

$$NSR_d = \frac{1}{EC}(ENSR_{TARG} - ENSR). \quad [2]$$

For this case, assuming EC=1, the relative amount of digital noise required to obtain a loaded ENSR estimate that matches the target may be calculated as $NSR_d^{dB}=0.1259-0.0501=0.0758$ (which is equivalent to $NSR_d^{dB}=-11.2$ dB). This relative noise amount, when loaded during the processing 232, results in the loaded ENSR estimate matching the target and may reduce or eliminate oscillation that would otherwise be present in one or more control loops. The loaded ENSR estimate includes a contribution from the digital noise loading which may be removed in order to obtain an estimate of ENSR in the absence of any noise loading, according to Equation 3:

$$ENSR_0 = ENSR_1 - EC \cdot NSR_d, \quad [3]$$

where $NSR_d$ denotes the relative amount of digital noise loaded by the digital noise generator 254, where $ENSR_1$ denotes the loaded ENSR estimate, and where $ENSR_0$ denotes a new estimate of ENSR without the contribution of noise from digital noise loading. The new estimate $ENSR_0$ is calculated based on measurements acquired in the presence of sufficient noise to avoid oscillation of the control loops (as a result of the digital noise loading). This allows for an estimate of what the ENSR would be in the high SNR regime if the control loops were stable. Thus, in the event that the loaded ENSR estimate is determined to be equal to or greater than the target, the loaded ENSR estimate may be used, together with the relative digital noise amount $NSR_d$ that is currently being loaded into the digital signal processing 232, to calculate a new estimate $ENSR_0$. This new ENSR estimate is not contaminated by the effects of oscillating control loops, so it may be used to achieve a more accurate estimate of external noise. For example, the value of $ENSR_0$ may be substituted for the value of ENSR in Equation 1 when calculating $NSR_{EXT}$. Although not illustrated in FIG. 2, calculation of the new noise estimate $ENSR_0$, as well as the calculation of $NSR_{EXT}$ (using Equation 1, for example) may be implemented by the ASIC 226.

Most examples described herein are specific to LMS control loop oscillations. However, it is contemplated that the proposed techniques for digital noise loading may be applied for any control loop which acts on an error signal which is derived from the difference between a received waveform and estimates of the transmitted waveform, where those estimates may be contaminated by decision errors.

The scope of the claims should not be limited by the details set forth in the examples, but should be given the broadest interpretation consistent with the description as a whole.

What is claimed is:

1. A receiver device comprising:
    circuitry configured to generate a digital signal representative of data conveyed by a communication signal detected at the receiver device;
    circuitry configured to apply digital signal processing to the digital signal, thereby generating a processed signal;
    circuitry configured to determine a relative noise estimate for the processed signal; and
    circuitry configured to load a relative amount of digital noise into the digital signal processing based on a comparison between the relative noise estimate and a target.

2. The receiver device as claimed in claim 1, further comprising
    circuitry configured to increase the relative amount of digital noise responsive to determining that the relative noise estimate is lower than the target.

3. The receiver device as claimed in claim 1, further comprising
    circuitry configured to decrease the relative amount of digital noise responsive to determining that the relative noise estimate is greater than the target.

4. The receiver device as claimed in claim 1, wherein the relative noise estimate comprises an effective noise to signal ratio (ENSR) estimate or a Bit Error Ratio (BER) estimate.

5. The receiver device as claimed in claim 1, further comprising
    circuitry configured to determine a loaded relative noise estimate for a new processed signal that was generated while loading the relative amount of digital noise into the digital signal processing, wherein the loaded relative noise estimate is equal to or greater than the target; and
    circuitry configured to calculate a new relative noise estimate based on the loaded relative noise estimate and the relative amount of digital noise.

6. The receiver device as claimed in claim 1, further comprising
    circuitry configured to adjust the amount of digital noise by causing an adjustment of one or more filters comprised in the circuitry configured to apply the digital signal processing to the digital signal.

7. The receiver device as claimed in claim 1, wherein the circuitry configured to apply the digital signal processing is further configured to implement at least one control loop, and wherein, responsive to loading the amount of digital noise into the digital signal processing, the at least one control loop is configured to operate with more stability than prior to the loading.

8. The receiver device as claimed in claim 7, wherein the at least one control loop comprises any one or more of a least mean squares (LMS) control loop, an in-phase quadrature (IQ) control loop, and a carrier recovery loop.

9. The receiver device as claimed in claim 7, wherein the target is a relative noise value greater than a maximum relative noise value associated with instability of the at least one control loop.

10. The receiver device as claimed in claim 1, further comprising
    circuitry configured to select the target based on a current transmission mode of the receiver device.

11. A method performed at a receiver, the method comprising:
    generating a digital signal representative of data conveyed by a communication signal detected at the receiver;
    applying digital signal processing to the digital signal, thereby generating a processed signal;
    determining a relative noise estimate for the processed signal; and
    loading an amount of digital noise into the digital signal processing based on a comparison between the relative noise estimate and a target.

12. The method as claimed in claim 11, further comprising increasing the amount of digital noise responsive to determining that the relative noise estimate is lower than the target.

13. The method as claimed in claim 11, further comprising decreasing the amount of digital noise responsive to determining that the relative noise estimate is greater than the target.

14. The method as claimed in claim 11, wherein the relative noise estimate comprises an effective noise to signal ratio (ENSR) estimate or a Bit Error Ratio (BER) estimate.

15. The method as claimed in claim 11, further comprising determining a loaded relative noise estimate for a new processed signal that was generated while loading the relative amount of digital noise into the digital signal processing, wherein the loaded relative noise estimate is equal to or greater than the target; and calculating a new relative noise estimate based on the loaded relative noise estimate and the relative amount of digital noise.

16. The method as claimed in claim 11, further comprising adjusting the amount of digital noise by causing an adjustment of one or more filters comprised in the circuitry configured to apply the digital signal processing to the digital signal.

17. The method as claimed in claim 11, wherein the digital signal processing implements at least one control loop, the method further comprising responsive to loading the amount of digital noise, the at least one control loop operating with more stability than prior to the loading.

18. The method as claimed in claim 17, wherein the at least one control loop comprises any one or more of a least mean squares (LMS) control loop, an in-phase quadrature (IQ) control loop, and a carrier recovery loop.

19. The method as claimed in claim 17, wherein the target is a relative noise value greater than a maximum relative noise value associated with instability of the at least one control loop.

20. The method as claimed in claim 11, further comprising selecting the target based on a current transmission mode of the receiver.

* * * * *